United States Patent
Held et al.

(10) Patent No.: US 11,157,951 B1
(45) Date of Patent: Oct. 26, 2021

(54) SYSTEM AND METHOD FOR DETERMINING AND DISPLAYING AN OPTIMAL ASSIGNMENT OF DATA ITEMS

(71) Applicant: Palantir Technologies Inc., Palo Alto, CA (US)

(72) Inventors: Amanda Held, Los Angeles, CA (US); David Kinsella, San Francisco, CA (US); David Montague, East Palo Alto, CA (US); Michael Fink, Menlo Park, CA (US); Taylor Gregoire-Wright, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 616 days.

(21) Appl. No.: 15/823,080

(22) Filed: Nov. 27, 2017

Related U.S. Application Data

(60) Provisional application No. 62/435,659, filed on Dec. 16, 2016.

(51) Int. Cl.
*G06Q 30/02* (2012.01)
*G06F 3/0482* (2013.01)

(52) U.S. Cl.
CPC ....... *G06Q 30/0247* (2013.01); *G06F 3/0482* (2013.01); *G06Q 30/0202* (2013.01); *G06Q 30/0255* (2013.01)

(58) Field of Classification Search
None
See application file for complete search history.

(56) References Cited

U.S. PATENT DOCUMENTS

| 5,418,950 A | 5/1995 | Li et al. |
| 5,428,737 A | 6/1995 | Li et al. |

(Continued)

FOREIGN PATENT DOCUMENTS

| DE | 102014103482 | 9/2014 |
| EP | 1647908 | 4/2006 |

(Continued)

OTHER PUBLICATIONS

Heyzapdevblog,"Being smart about cross-promo", 2013, https://heyzapdevblog.tumblr.com/page/4, pp. 7-13 (Year: 2013).*

(Continued)

*Primary Examiner* — John Van Bramer
(74) *Attorney, Agent, or Firm* — Knobbe Martens Olson & Bear LLP

(57) ABSTRACT

Various systems and methods for providing a tool to entities that determines the optimal usage of data items are disclosed. For example, the tool can generate a model that uses various characteristics to predict how likely it is that a viewer will watch (or listen to) the media program being promoted. The model can then determine an increase in revenue that would result from the assignment of a media promo using the predicted likelihood and subtracting a known opportunity cost from this determined revenue increase to determine a net revenue value. The model can repeat this determination for any number of viewers and aggregate the determined net revenue values to generate an aggregated net revenue value. The tool may include a user interface in which a content provider can adjust various variables to see how adjusting one or more variables affects the aggregated net revenue value.

17 Claims, 6 Drawing Sheets

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Xbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bingham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B2 | 1/2012 | Embley et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing | |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 8,935,303 B2 | 1/2015 | Karatzoglou et al. | |
| 9,031,981 B1 | 5/2015 | Potter et al. | |
| 9,105,000 B1 | 8/2015 | White et al. | |
| 9,176,966 B2 | 11/2015 | Silverstein et al. | |
| 9,292,388 B2 | 3/2016 | Fisher et al. | |
| 9,330,120 B2 | 5/2016 | Colgrove et al. | |
| 9,652,510 B1 | 5/2017 | Huang et al. | |
| 10,708,654 B1 * | 7/2020 | Moraghan | H04N 21/25866 |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0193608 A1 | 9/2004 | Gollapudi et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0156673 A1 | 7/2007 | Maga | |
| 2007/0168336 A1 | 7/2007 | Ransil et al. | |
| 2007/0178501 A1 | 8/2007 | Rabinowitz et al. | |
| 2007/0185867 A1 | 8/2007 | Maga | |
| 2007/0192281 A1 | 8/2007 | Cradick et al. | |
| 2007/0260582 A1 | 11/2007 | Liang | |
| 2008/0028327 A1 * | 1/2008 | Hirota | G06F 8/38 715/762 |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2008/0270398 A1 | 10/2008 | Landau et al. | |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0259518 A1 * | 10/2009 | Harvey | G06Q 40/00 705/7.29 |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0313119 A1 | 12/2010 | Baldwin et al. | |
| 2011/0035396 A1 | 2/2011 | Merz et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0093490 A1 | 4/2011 | Schindlauer et al. | |
| 2011/0131547 A1 | 6/2011 | Elaasar | |
| 2011/0145401 A1 | 6/2011 | Westlake | |
| 2011/0208822 A1 | 8/2011 | Rathod | |
| 2011/0218955 A1 | 9/2011 | Tang | |
| 2011/0252282 A1 | 10/2011 | Meek et al. | |
| 2011/0258216 A1 | 10/2011 | Supakkul et al. | |
| 2011/0270871 A1 | 11/2011 | He et al. | |
| 2011/0295649 A1 | 12/2011 | Fine | |
| 2011/0321008 A1 | 12/2011 | Jhoney et al. | |
| 2012/0078595 A1 | 3/2012 | Balandin et al. | |
| 2012/0102022 A1 | 4/2012 | Miranker et al. | |
| 2012/0159449 A1 | 6/2012 | Arnold et al. | |
| 2012/0173381 A1 | 7/2012 | Smith | |
| 2012/0174057 A1 | 7/2012 | Narendra et al. | |
| 2012/0188252 A1 | 7/2012 | Law | |
| 2012/0284719 A1 | 11/2012 | Phan et al. | |
| 2013/0024268 A1 | 1/2013 | Manickavelu | |
| 2013/0024731 A1 | 1/2013 | Shochat et al. | |
| 2013/0054306 A1 | 2/2013 | Bhalla | |

(56) References Cited

U.S. PATENT DOCUMENTS

| | | |
|---|---|---|
| 2013/0054551 A1 | 2/2013 | Lange |
| 2013/0086482 A1 | 4/2013 | Parsons |
| 2013/0096968 A1 | 4/2013 | Van Pelt et al. |
| 2013/0110746 A1 | 5/2013 | Ahn |
| 2013/0185245 A1 | 7/2013 | Anderson |
| 2013/0187926 A1 | 7/2013 | Silverstein |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0143252 A1 | 5/2014 | Silverstein et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0269030 A1 | 9/2015 | Fisher et al. |
| 2016/0026923 A1 | 1/2016 | Erenrich et al. |
| 2017/0083935 A1* | 3/2017 | Maughan ........... G06Q 30/0244 |
| 2018/0096382 A1* | 4/2018 | Maughan ........... G06Q 30/0246 |

FOREIGN PATENT DOCUMENTS

| | | |
|---|---|---|
| EP | 2634745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

Heyzapdevblog,"Being smart about cross-promo", 2013, https://heyzapdevblog.tumblr.eom/page/4, pp. 7-13 (Year: 2013).*
"A Quick Guide to UniProtKB Swiss-Prot & TrEMBL," Sep. 2011, pp. 2.
"A Tour of Pinboard," <http://pinboard.in/tour> as printed May 15, 2014 in 6 pages.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
"The FASTA Program Package," fasta-36.3.4, Mar. 25, 2011, pp. 29.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51-55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wang et al., "Distributed Collaborative Filtering for Peer-to-Peer File Sharing Systems," Proceedings of the 2006 ACM Symposium on Applied Computing, pp. 1026-1030; SAC'06 Apr. 23-27, 2006.
Wikipedia, "Machine Code", p. 1-5, printed Aug. 11, 2014.

(56) References Cited

OTHER PUBLICATIONS

Wollrath et al., "A Distributed Object Model for the Java System," Proceedings of the 2nd Conference on USENEX, Conference on Object-Oriented Technologies (COOTS), Jun. 17, 1996, pp. 219-231.

* cited by examiner

SYSTEM AND METHOD FOR DETERMINING AND DISPLAYING AN OPTIMAL ASSIGNMENT OF DATA ITEMS

CROSS-REFERENCE TO RELATED APPLICATIONS

This application claims priority under 35 U.S.C. § 119(e) to U.S. Provisional Application No. 62/435,659, entitled "SYSTEM AND METHOD FOR DETERMINING AND DISPLAYING AN OPTIMAL ASSIGNMENT OF DATA ITEMS" and filed on Dec. 16, 2016, which is hereby incorporated by reference in its entirety.

TECHNICAL FIELD

The present disclosure relates to systems and techniques for accessing one or more databases, and aggregating, analyzing, and displaying data in interactive user interfaces. More specifically, the present disclosure relates to systems and techniques for determining optimal assignments of data items.

BACKGROUND

Entities, such as content providers, often assign first data item types (e.g., advertisements) or second data item types (e.g., media promos, such as, webcast promos, movie promos, radio promos, podcast promos, television show promos etc.) to available slots in a data item of a third type (e.g., media, such as a webcast, a movie, a radio show, a podcast, a television show etc.). It can be difficult, however, for an entity to determine whether a first data item type or a second data item type should be assigned to a given slot. For example, in some circumstances, assigning a data item of the first data item type to an available slot can result in a more optimal usage of the data items than assigning a data item of the second data item type to the available slot. In other circumstances, the reverse may be true. Several data variables that may be dependent on each other may determine which assignment of data items results in an optimal usage of data items. Because of the inter-dependency of one or more of the data variables and the high number of data variables that affect the determination, a human may not be able to discern patterns in the values of the data variables that would be necessary to determine the optimal usage of the data items.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for providing a tool to entities that determines the optimal usage of data items (e.g., the optimal assignment of advertisements and media promos to available slots during a media program). For example, the tool can generate a model that uses various characteristics (e.g., age, gender, media watching (or listening) habits, and the number of media promos seen (or heard) by a viewer) to predict how likely it is that a viewer will watch (or listen to) the media program being promoted. A media program can include a webcast, a movie, a radio show, a podcast, a television show and/or the like. Similarly, a media promo can include a webcast promo, a movie promo, a radio show promo, a podcast promo, a television show promo, and/or the like. The model can then determine an increase in revenue that would result from the assignment of a media promo using the predicted likelihood and subtracting a known opportunity cost from this determined revenue increase to determine a net revenue value. The model can repeat this determination for any number of viewers and aggregate the determined net revenue values to generate an aggregated net revenue value. The tool may include a user interface in which a content provider can adjust various variables (e.g., number of media promo views, channel(s) in which media promos are played, when media promos are aired, etc.) to see how adjusting one or more variables affects the aggregated net revenue value.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

One aspect of the disclosure provides a computer-implemented method for optimizing an assignment of a plurality of data units. The computer-implemented method comprises: receiving, from a user device over a network, first data and second data, where the first data comprises an identification of a plurality of viewers that viewed a first data item and a second plurality of viewers that viewed a second data item, and where the second data comprises an identification of a third data item associated with the second data item that aired during the first data item and a number of times that the third data item aired during the first data item; determining, using the first data and the second data, that a first viewer in the plurality of viewers viewed the first data item and the second data item; determining a likelihood that the first viewer will view a fourth data item given an airing of a fifth data item related to the fourth data item a threshold number of times, where the determination of the likelihood is based on an age of the first viewer, a gender of the first viewer, viewing habits of the first viewer, and the number of times that the third data item aired during the first data item; determining a change in a first value based on the likelihood that the first viewer will view the fourth data item given the airing of the fifth data item the threshold number of times; determining a change in a second value based on the change in the first value and a third value; and transmitting, over the network, user interface data that causes the user device to display the determined change in the second value.

The computer-implemented method of the preceding paragraph can include any sub-combination of the following features: where the first data item comprises a first media program and the second data item comprises a second media program; where the third data item comprises a first media promo that promotes the second media program; where determining, using the first data and the second data, that a first viewer in the plurality of viewers viewed the first data item and the second data item further comprises determining that the first viewer in the plurality of viewers viewed the first data item and the second data item because the first data and the second data indicates that the first viewer viewed the first data item and the third data item; where determining a change in a first value further comprises: receiving an indication of a selection of a first parameter, determining a second likelihood that the first viewer will view the fourth data item given the airing of the fifth data item the threshold number of times according to the first parameter, and determining the change in the first value based on the second likelihood; where the first parameter is one of a change in a baseline gross rating point, a selection of a time for airing the fifth data item, a media channel on which the fifth data item is aired, viewer demographics, a selection of a time of day that the fifth data item is aired, or a genre of the fourth data item; where the user interface data further comprises an indication in a change in conversions determined as a result in a change in a number of times that the fifth data item is aired; where the user interface data further comprises a graph depicting a change in a likelihood for the plurality of viewers to watch (or listen to) the fourth data item as a function of a number of times that the fifth data item is aired; where the user interface data further comprises a graph depicting a change in viewership of the fourth data item as a function of a number of impressions associated with the fourth data item; where the first value comprises advertising revenue generated as a result of airing the fourth data item; and where the second value comprises net advertising revenue and the third value comprises a media promo opportunity cost.

Another aspect of the disclosure provides a system for optimizing an assignment of a plurality of data units. The system comprises a database configured to store first data and second data, where the first data comprises an identification of a plurality of viewers that viewed a first data item and a second plurality of viewers that viewed a second data item, and where the second data comprises an identification of a third data item associated with the second data item that aired during the first data item and a number of times that the third data item aired during the first data item. The system further comprises a data store configured to store computer-executable instructions. The system further comprises a processor in communication with the data store, where the computer-executable instructions, when executed, cause the processor to: retrieve, over a network, the first data and the second data; determine, using the first data and the second data, that a first viewer in the plurality of viewers viewed the first data item and the second data item; determine a likelihood that the first viewer will view a fourth data item given an airing of a fifth data item related to the fourth data item a threshold number of times, where the determination of the likelihood is based on at least one of an age of the first viewer, a gender of the first viewer, viewing habits of the first viewer, or the number of times that the third data item aired during the first data item; determine a change in a first value based on the likelihood that the first viewer will view the fourth data item given the airing of the fifth data item the threshold number of times; determine a change in a second value based on the change in the first value and a third value; and transmit, over the network, user interface data that causes the user device to display the determined change in the second value.

The system of the preceding paragraph can include any sub-combination of the following features: where the first data item comprises a first media program and the second data item comprises a second media program; where the third data item comprises a first media promo that promotes the second media program; where the computer-executable instructions, when executed, further cause the processor to determine that the first viewer in the plurality of viewers viewed the first data item and the second data item because the first data and the second data indicates that the first viewer viewed the first data item and the third data item; where the computer-executable instructions, when executed, further cause the processor to: receive an indication of a selection of a first parameter, determine a second likelihood that the first viewer will view the fourth data item given the airing of the fifth data item the threshold number of times according to the first parameter, and determine the change in the first value based on the second likelihood; where the first parameter is one of a change in a baseline gross rating point, a selection of a time for airing the fifth data item, a media channel on which the fifth data item is aired, viewer demographics, a selection of a time of day that the fifth data item is aired, or a genre of the fourth data item; where the user interface data further comprises an indication in a change in conversions determined as a result in a change in a number of times that the fifth data item is aired; where the user interface data further comprises a graph depicting a change in a likelihood for the plurality of viewers to watch (or listen to) the fourth data item as a function of a number of times that the fifth data item is aired; and where the user interface data further comprises a graph depicting a change in viewership of the fourth data item as a function of a number of impressions associated with the fourth data item.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION OF SPECIFIC EMBODIMENTS

Overview

Figure 1:
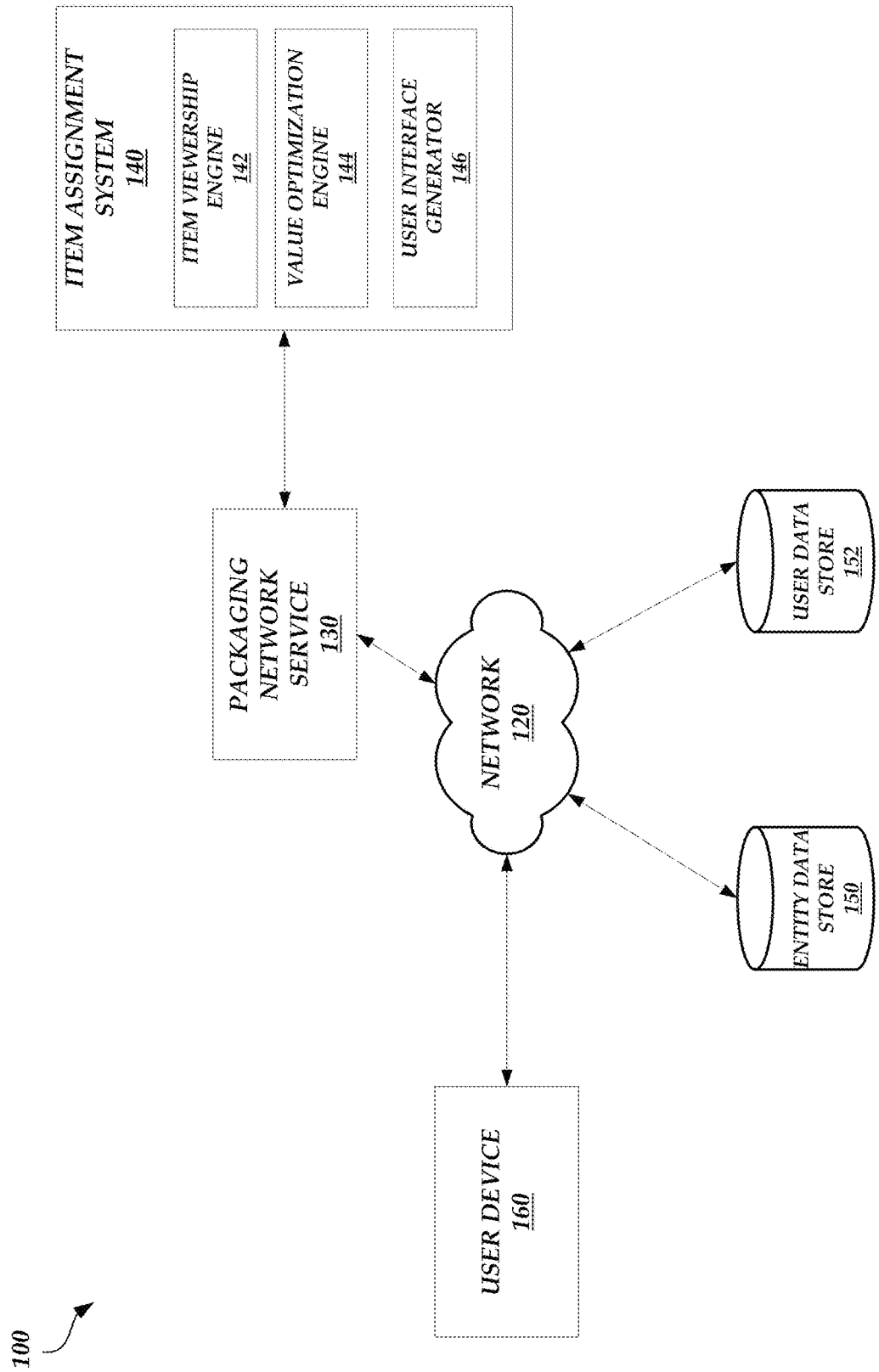
FIG. 1 illustrates an example block diagram showing the various components of a data item assignment system, in accordance with some embodiments.

As described above, it can be difficult for an entity to determine whether a first data item type or a second data item type should be assigned to a given slot in a data item of a third type. For example, in some circumstances, assigning a data item of the first data item type to an available slot can result in a more optimal usage of the data items than assigning a data item of the second data item type to the available slot. In other circumstances, the reverse may be true. Several data variables that may be dependent on each other may determine which assignment of data items results in an optimal usage of data items. Because of the inter-dependency of one of more of the data variables and the high number of data variables that affect the determination, a human may not be able to discern patterns in the values of the data variables that would be necessary to determine the optimal usage of the data items.

As an illustrative example, a slot may be available during a media program and a content provider may have the option of filling the slot with an advertisement or a media promo. The slot may be associated with a price that is charged to an advertiser if an advertisement is assigned to the available slot. Thus, assigning an advertisement to an available slot may result in increased revenue for the content provider. On the other hand, media promos are generated by and/or owned by the content provider. Thus, assigning a media promo to an available slot may not result in an immediate increase in revenue. In fact, the content provider may suffer an immediate opportunity cost due to the fact that the available slot is not assigned to an advertisement that could increase revenue. Media promos, though, may result in an increased viewership for the media program being promoted. Accordingly, assigning a media promo to an available slot can, in the future, result in increased advertisement revenue for the content provider. Given the inter-dependency of the data variables that affect how much the assignment of an advertisement or a media promo to an available slot affects the content provider's revenue, humans cannot readily identify the patterns or trends that lead to the optimal assignment of advertisements and media promos.

Accordingly, systems and methods are described herein for providing a tool to entities that determines the optimal usage of data items (e.g., the optimal assignment of advertisements and media promos to available slots during a media program). For example, the tool can generate a model that uses various characteristics (e.g., age, gender, media watching (or listening) habits, and the number of media promos seen (or heard) by a viewer) to predict how likely it is that a viewer will watch (or listen to) the media program being promoted. A media program can include a webcast, a movie, a radio show, a podcast, a television show, and/or the like. Similarly, a media promo can include a webcast promo, a movie promo, a radio show promo, a podcast promo, a television show promo, and/or the like. The model can then determine an increase in revenue that would result from the assignment of a media promo using the predicted likelihood and subtracting a known opportunity cost from this determined revenue increase to determine a net revenue value. The model can repeat this determination for any number of viewers and aggregate the determined net revenue values to generate an aggregated net revenue value. The tool may include a user interface in which a content provider can adjust various variables (e.g., number of media promo views, channel(s) in which media promos are played, when media promos are aired, etc.) to see how adjusting one or more variables affects the aggregated net revenue value.

The systems and methods described herein may be applied to various fields in which data items are to be optimally assigned. One such field is media advertising, in which a determination is made as to how the placement of advertisements (e.g., first types of data items) or media promos (e.g., second types of data items) in various advertisement spots affects total advertising revenue. An advertising spot may be a portion of a commercial break in a media program that an advertiser may purchase to advertise a product. An advertisement may be a video segment used to advertise a product or item. A media promo may be a specific type of advertisement in which a content provider distributing the media promo is advertising a media program provided by the content provider on one of the media channels operated by the content provider with the aim of encouraging additional viewers to watch (or listen to) the advertised media program. In this field, and in other similar fields, it may be challenging to determine how the placement of advertisement spots or media promos affects total advertising revenue and how to adjust the number of times a media promo is shown (or otherwise played), when media promos are shown (or otherwise played), and where media promos are shown or otherwise played (e.g., on which media channel is the media promo shown or otherwise played) to achieve an optimal net advertising revenue given the multiple, often dependent, factors that affect the determination. For example, characteristics of a viewer (e.g. age, gender, etc.), media viewing (or listening) habits of the viewer, how the viewing (or listening) of one or more media promos affects the likelihood that the viewer will watch (or listen to) the media program being promoted, and/or other similar factors may be one set of factors that are considered in determining total advertising revenue. The number of media promos that are shown (or otherwise played) in given time period (e.g. during the commercial breaks of a single media program, an hour, a day, etc.), when media promos are shown or otherwise played (e.g., in the morning, afternoon, evening, late night, etc.), and where media promos are shown or otherwise played (e.g., on the media channel that provides the advertised media program, on another channel that does not provide the advertised media program, etc.) are a second set of factors that can affect the optimal net advertising revenue (e.g., the highest advertising revenue that can be achieved via the selection of advertisements or media promos to be assigned to each advertisement spot) and may be dependent not only on the characteristics of the advertised media program, but also on one or more of the first set of factors. Similarly, the number of media promos that are shown (or otherwise played) may affect how the characteristics of the viewer affects total advertising revenue. The total and/or optimal net advertising revenue is nearly impossible for any person to discern given the inter-dependency of these factors.

Other such fields include network-based advertisements and network-based self-promotion (e.g., the promotion of products, items, or content offered by third parties versus the promotion of products, items, or content provided by the entity that operates the network-based system), billboard advertisements and billboard self-promotion (e.g., the promotion of products, items, or content offered by third parties versus the promotion of products, items, or content provided by the entity that operates the billboard), third party insurance plans and entity-offered insurance plans (e.g., the promotion of insurance plans offered by third parties versus the promotion of insurance plans offered by the entity that operates the service providing insurance plans for purchase), and/or the like.

The systems and methods disclosed herein help overcome these challenges by employing interactive user interfaces and modeling techniques for enabling a user (e.g., an account executive at a media network, a sales representative of a manufacturing company, etc.) to efficiently or optimally assign data items (e.g., media advertisements, media promos, network-based advertisements, network-based self-promotion, billboard advertisements, billboard self-promotion, consumer products, third party insurance plans, entity-offered insurance plans, etc.) to slots (e.g., media advertisement spots, network-based advertisement space, billboard space, insurance plan options, etc.) in a data-driven way to, for example, optimize revenue.

As used herein, the term "data item" is a broad term including its ordinary and customary meaning, and includes, but is not limited to, representations of any type of data that may be assignment. For example, data items may include various types of items (e.g., media promos, media advertisements, billboard advertisements, insurance plans, products, etc.) and/or various types of events (e.g., webcasts, movies, radio shows, podcasts, television shows, advertisement spots, trade fairs, store-wide sales, product releases, etc.). Data items may be associated with one another, and further may relate to a given period of time, place, medium, and/or the like. For example, an advertisement spot may be a period of time (e.g., 15 seconds, 30 seconds, 1 minute, etc.) during a commercial break of a media program. In another example, an advertisement spot may be a portion of a media program where an advertiser may place a product, logo, jingle, etc. that may be viewed (or heard) during the media program. In another example, data items may include download codes for various electronic products, reservation/ confirmation codes for participating in events, purchasing products, and/or the like. Data items may represent any other relevant event or thing depending on the implementation and/or the field of application of the system.

As mentioned above, throughout the present disclosure media advertisements (e.g., webcast advertisements, movie advertisements, radio advertisements, podcast advertisements, television advertisements, etc.) or media promos advertised in advertisement spots during a media program may be used as an example of a data item. However, there may be a variety of data items that may be suitable for use with the described systems and methods. For example, suitable data items may include network-based advertisements (e.g., advertisement viewed (or heard) on web pages, in web series, in social media, in mobile applications, etc.), a billboard, a cover of a video game, an announcement during a sporting event, consumer products, insurance plans, and/or the like.

Example Systems and Network Environment

FIG. 1 illustrates an example block diagram showing the various components of a data item assignment system 100, in accordance with some embodiments. As illustrated in FIG. 1, the data item assignment system 100 includes a packaging network service 130 (e.g., a web service), an item assignment system 140, an entity data store 150, a user data store 152, and a user device 160. The packaging network service 130, the entity data store 150, the user data store 152, and/or the user device 160 may communicate via a network 120.

The packaging network service 130 may be a computer program or system designed to aggregate, analyze, and/or output data for use in analysis of various information. For example, the packaging network service 130 can aggregate and/or analyze data for transmission to the item assignment system 140. Such data may be retrieved from the entity data store 150 and/or the user data store 152 via the network 120. The packaging network service 130 can then receive data identifying a total advertising revenue and/or a change in advertising revenue that results from changes in one or more of the second set of factors from the item assignment system 140 and output the data to the user device 160 via the network 120. In some embodiments, the packaging network service 130 and/or other components of FIG. 1 may call an application programming interface (API) to perform various functions. For example, the packaging network service 130 can call an API offered by the item assignment system 140 to receive the data.

One or both of the data stores 150 and 152 may be databases. For example, the entity data store 150 may store, for one or more entities (e.g., content providers), a list of available media promos, a list of available media advertisements, and/or associated distribution data (e.g., historical data such as how often media advertisements or media promos are included in advertisement spots, which media promos and/or media advertisements are played during commercial breaks of individual media programs, when media promos and media advertisements and which media promos and/or media advertisements are played on individual distribution channels (e.g., media channels, such as television channels, radio channels, network-based channels, etc.)). The entity data store 150 can further store, for one or more advertisements, a gross rating point (GRP) associated with the respective advertisement. The GRP may quantify the number of impressions of an advertisement as a percentage of the target audience. In addition, the entity data store 150 can store, for one or more entities, data identifying advertising revenue for the respective entity (e.g., based on the price of advertisements during various commercial breaks of various media programs and viewership of such advertisements) and/or a media promo opportunity cost (e.g., the amount of revenue lost by not selling an advertisement spot to an advertiser or, in other words, the cost to advertise in an advertisement spot).

The user data store 152 may store characteristics of various viewers (e.g., age, gender, etc.), media viewing (or listening) habits of various viewers (e.g., when the viewer watches (or listens to) media, how long the viewer watches (or listens to) media, what media programs the viewer watches (or listens to) (and therefore, because certain media promos are aired during commercial breaks of the media programs that the user watches (or listens to), what media promos the viewer watched (or listened to) and how many times the viewer watched (or listened to) a given media promo), and/or the like. The user data store 152 may store such information for various viewers over different time periods (e.g., weekdays, weekends, holidays, seasons, time of day, etc.). The user data store 152 may also store viewer models trained by the item viewership engine 142 described below.

As used herein, the term "database" is broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure. Such data structures may be configured to store computer-executable instructions that may communicate with various hardware processors to cause said processors to perform various functions.

The item assignment system 140 can include various components. For example, the item assignment system 140 can include an item viewership engine 142, a value optimization engine 144, and a user interface generator 146. The item viewership engine 142 may be configured to generate a viewership model for a particular viewer that can be used to determine a likelihood that the viewer will watch (or listen to) a media program in response to viewing (or listening to) one or more media promos advertising the media program. The item viewership engine 142 can train the model based on historical information associated with the viewer that is stored in the user data store 152. For example, the item viewership engine 142 can use the data stored in the user data store 152 to identify, for a particular user, whether the viewer watched (or listened to) both a media promo of a first media program and then later the first media program itself (and how many times the viewer saw (or heard) the media promo of the first media program), whether the viewer watched (or listened to) only the first media program and not the media promos of the first media program, and/or whether the viewer watched (or listened to) the media promo of the first media program (and how many times the viewer saw (or heard) the media promo of the first media program) and then did not watch (or listen to) the first media program.

The historical trends in viewership by the viewer identified by the item viewership engine 142 based on analysis of this data (e.g., watching (or listening to) a media promo X extra times increases the likelihood that the viewer watches (or listens to) the advertised media program Y times) can be useful in predicting how the viewer may react to media promos in the future. For example, if historically the viewer is 5 times more likely to watch (or listen to) a media program if the viewer sees a promo for the media program at least 2 times, then this trend more hold true for promos of other or future media programs.

Additional information considered by the item viewership engine 142, such as the viewer characteristics, the viewer media watching (or listening) habits, the number of media promos seen (or heard) by the viewer, and/or the like, can be useful in generating the model. For example, the viewer may watch (or listen to) media on certain nights. Thus, placing a media promo on a night that the viewer watches (or listens to) media for a media program that is not aired on a night that the viewer watches (or listens to) media may reduce a likelihood that the viewer will watch (or listen to) the media program being promoted and the model can take this into account.

The item viewership engine 142 can generate models for a plurality of viewers and send this information to the value optimization engine 144. The value optimization engine 144 can use the models to estimate net advertising revenue if a media promo or a media advertisement is placed in a certain advertisement spot. For example, the models take as an input a number of media promos that are aired promoting a certain media program (and when and/or where the media promos are aired) and produces a likelihood that the respective user will watch (or listen to) the promoted media program. The value optimization engine 144 can aggregate these likelihoods for a plurality of viewers to estimate a number of additional viewers that will watch (or listen to) the media program if a media promo is aired. The value optimization engine 144 can translate the number of additional viewers to an increase in advertising revenue that is generated in the future (e.g., when the media program is aired) as a result of the number of additional viewers (e.g., the relationship between the number of additional viewers and the increase in advertising revenue may be proportional, such that advertising revenue is the viewership times a constant value).

The value optimization engine 144 can then retrieve the media promo opportunity cost from the entity data store 150 to determine net advertising revenue. For example, the net advertising revenue may be the result of subtracting the media promo opportunity cost from the increase in advertising revenue that is generated in the future. The value optimization engine 144 can transmit this information to the user interface generator 146 such that the user interface generator 146 can generate user interface data that causes an application (e.g., a browser) running on the user device 160 to display the information.

The value optimization engine 144 can further receive parameter values that may affect the net advertising revenue determination. For example, the user device 160 may provide selections via the packaging network service 130 such that the user can identify how changing characteristics of the media promo (e.g., the GRPs of a media promo, when a media promo is aired, where a media promo is aired, etc.) affects the net advertising revenue. Once a selection is received, the value optimization engine 144 can rerun the models using the selection(s) (e.g., update the model inputs based on the selection(s)) and determine an updated net advertising revenue. The value optimization engine 144 can determine a difference between the original net advertising revenue and the updated net advertising revenue and instruct the user interface generator 146 to generate user interface data that includes the difference such that the difference can be displayed in a user interface (e.g., the user interface generator 146 can transmit the user interface data to the user device 160 via the packaging network service 130 for display on the user device 160). More details of how the characteristics can be changed is described below with respect to FIG. 2B.

In some embodiments, the value optimization engine 144 can automatically vary characteristics of the media promo to identify an optimal net advertising revenue. The optimal net advertising revenue may be the highest net advertising revenue that can be achieved given the different possible values for the media promo characteristics. The optimal net advertising revenue can also be included in the user interface data for display in a user interface.

The user device 160 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 160 may execute a browser application to communicate with the item assignment system 140.

The data item assignment system 100 may be used by content providers. For example, the user device 160 may be operated by a content provider interested in determining whether to place a media promo or a media advertisement in a particular advertisement spot. The content provider may instruct the item assignment system 140 to show how net advertising revenue changes as media promo characteristics change and/or to determine the media promo characteristics that result in optimal net advertising revenue.

In an embodiment, the network 120 includes any communications network, such as the Internet. The network 120 may be a wired network, a wireless network, or a combination of the two. For example, network 120 may be a local area network (LAN) and/or a wireless area network (WAN).

Additional details regarding the systems and/or services by which the functionality of the present disclosure is implemented are provided below.

Example Data Item Assignment User Interfaces

Figure 2A:
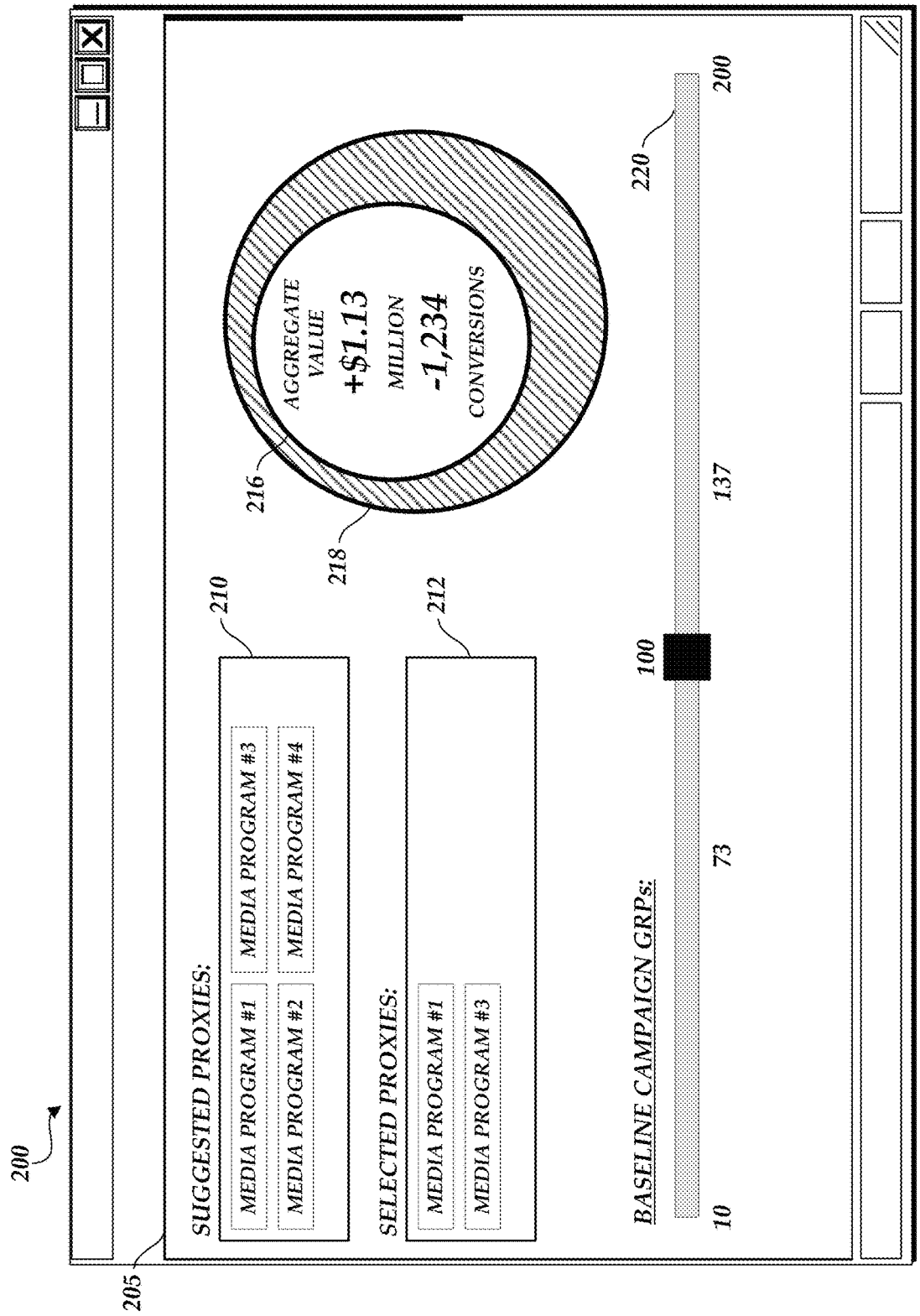
FIGS. 2A-2C illustrate a user interface displaying optimal values based on the assignment of data items.
Figure 2B:
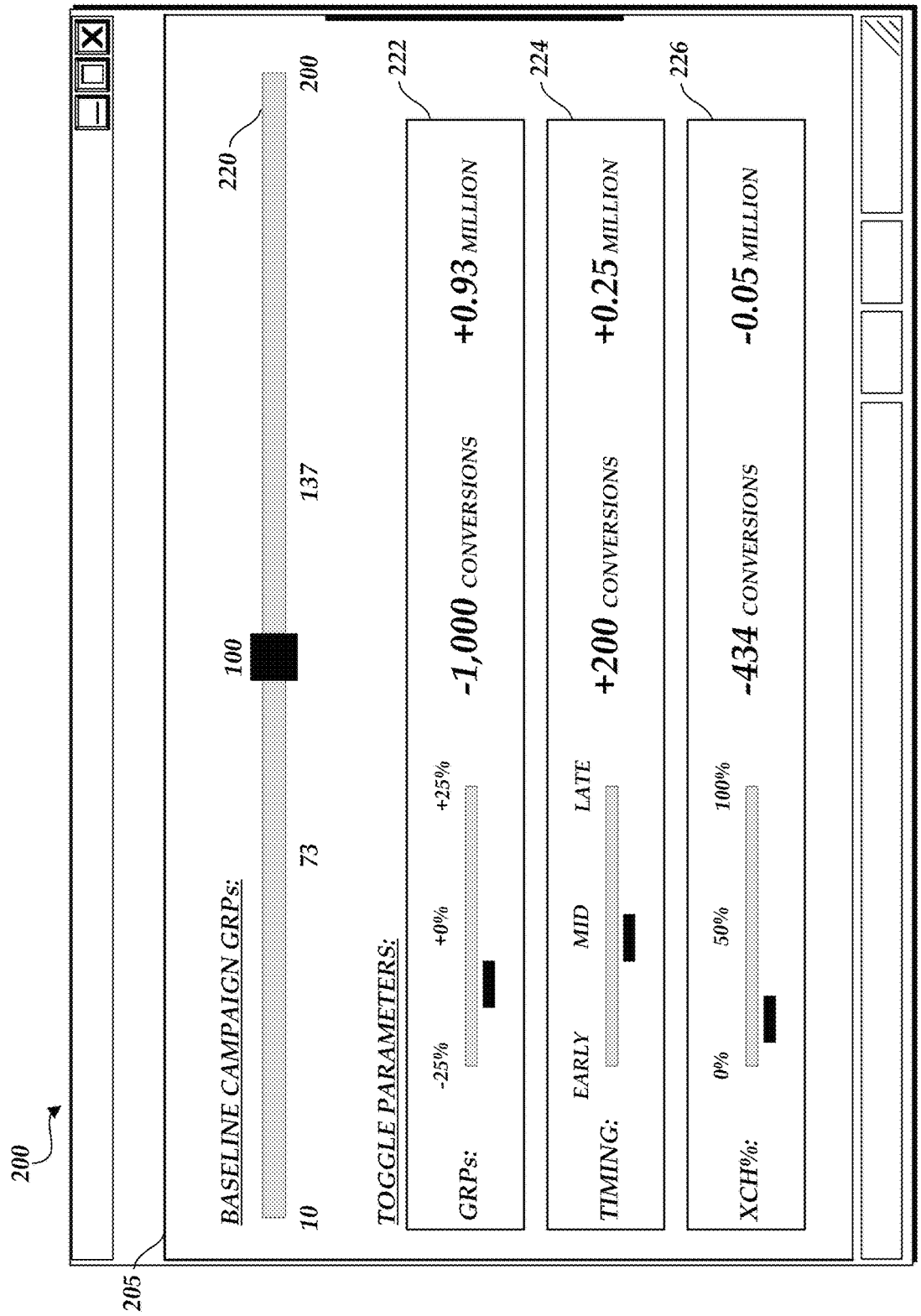
Figure 2C:
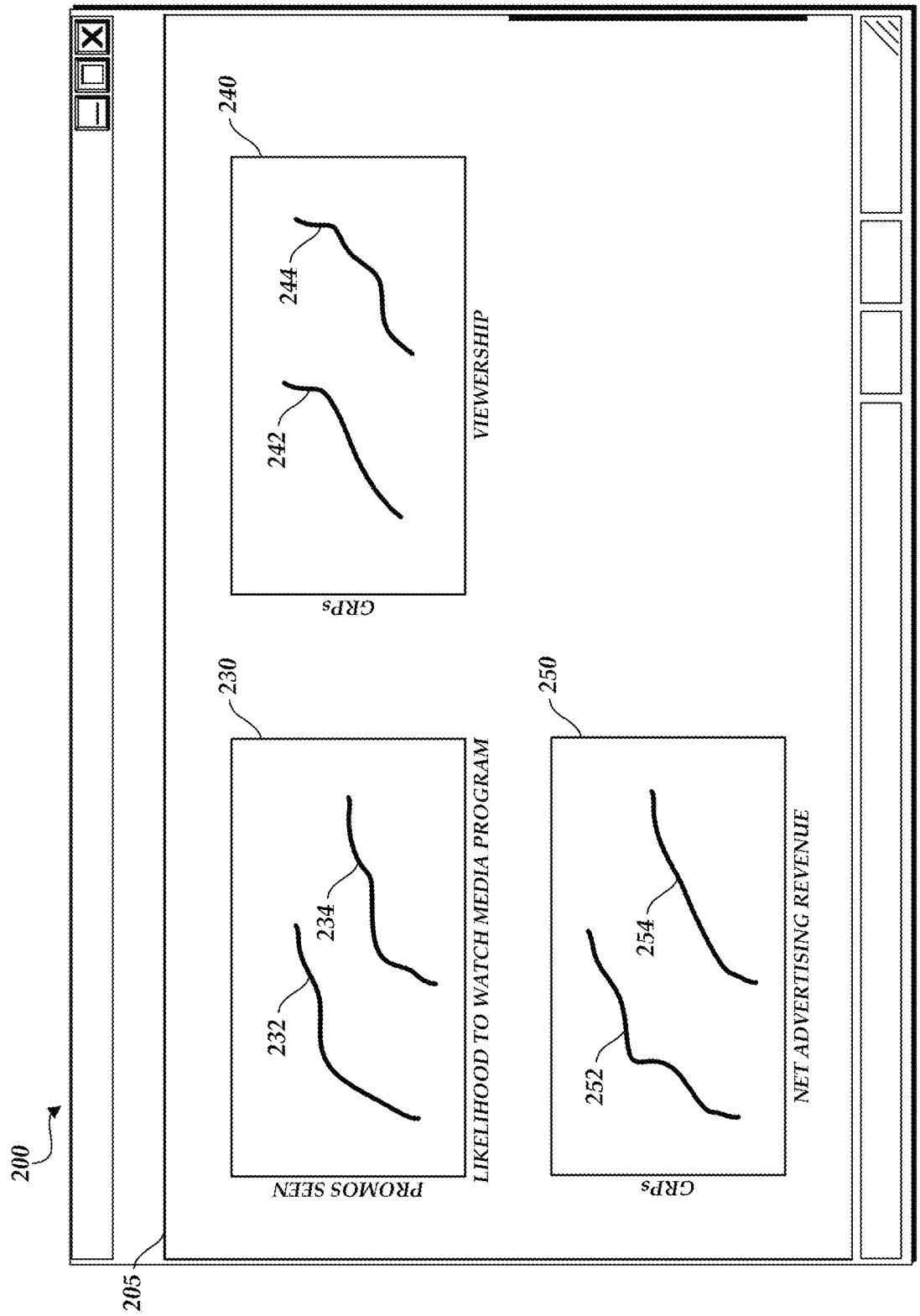

FIGS. 2A-2C illustrate a user interface 200 displaying optimal values based on the assignment of data items. The user interface 200 can be displayed by the user device 160 and user interface data that causes the user device 160 to display the user interface 200 can be generated by the user interface generator 146. The content included in the user interface data can be determined by the value optimization engine 144.

As illustrated in FIG. 2A, the user interface 200 includes a window 205 that includes a suggested proxies box 210 and a selected proxies box 212. The suggested proxies box 210 lists various media programs (e.g., media program #1, media program #2, etc.) that can be selected by the user. The listed media programs may be associated with the content provider to which the user is associated. Selection of a media program listed in the suggested proxies box 210 may result in the media program being listed in the selected proxies box 212.

Selection of a media program listed in the suggested proxies box 210 may cause the value optimization engine 144 to retrieve one or more viewer models from the item viewership engine 142 and/or the user data store 152 for the purpose of determining a net advertising revenue if a media promo promoting the selected media program is aired in an advertisement spot or multiple advertisement spots.

Circle 216 displays the aggregate value (e.g., the net advertising revenue) if a media promo for the selected media program is aired in an advertisement spot (or multiple advertisement spots) according to the toggled parameters identified in FIG. 2B. The circle 216 also displays the net conversions (e.g., the total number of viewers that view (or hear) a media program regardless of whether the viewers watch (or listen to) the media program because of an aired media promo) if a media promo for the selected media program is aired in an advertisement spot (or multiple advertisement spots) according to the toggled parameters identified in FIG. 2B. The aggregate value may be positive even if the net conversions is negative because the parameters may be toggled such that fewer media promos are aired (thereby resulting in fewer viewers of the media program), but additional revenue is received from current media advertisements (e.g., media advertisements that replace some of the media promos) that offset the loss in advertising revenue resulting from fewer viewers of the media program.

In some embodiments, the difference in size between the circle 216 and circle 218 represents a difference in the total number of GRPs that results from the toggled parameters identified in FIG. 2B. For example, the size of circle 218 may represent the baseline campaign GRPs level (described above) and the size of the circle 216 may represent the GRP level selected in box 222 (described above). Thus, the circle 216 can be smaller or larger than the circle 218.

Bar 220 identifies the baseline campaign GRPs for the selected media program. The baseline campaign GRP may be proportional to the number of times that a particular media promo is aired (e.g., the higher the GRPs, the more times the media promo is aired). For example, the default baseline campaign GRP value for a media program may be based on historical data stored in the entity data store 150. As another example, the default baseline campaign GRP value for a media program may be an average value derived from other media programs of the same type or genre as the selected media program.

As illustrated in FIG. 2B, the user can adjust the baseline campaign GRPs via the toggle bar in box 222. For example, the user can increase the GRPs above the baseline (e.g., by between 0 and 25%), can decrease the GRPs below the baseline (e.g., by between 0 and −25%), or can keep the GRPs the same as the baseline. FIG. 2B depicts the GRPs being toggled to be several percentage points below the baseline campaign GRPs. The value optimization engine 144 can rerun the models using the selected GRP parameter value (and assume that other parameter values remain unchanged) and the box 222 can display how the selection affects the aggregate value and the change in conversions. For example, by adjusting the GRPs to be several percentage points less than the baseline campaign GRP, the value optimization engine 144 determines that the number of conversions decreased by 1000 conversions (e.g., because fewer GRPs means fewer media promo airings, which therefore leads to fewer viewers of the media program) and the aggregate value increased by $0.93 million (e.g., because the reduction in media promos led to increased advertising revenue from media advertisements that filled advertisement spots originally intended for media promos).

The user can also adjust the timing of when media promos are aired in box 224. For example, the user can indicate that media promos should be shown (or otherwise played) far from the media program premiere date and/or closer to the media program premiere date. In other embodiments, not shown, the user can indicate more granular timings (e.g., specific times, specific time windows like morning, midday, or late night, specific days, specific weeks, specific seasons, etc.). The value optimization engine 144 can rerun the models using the selected timing (and assume that other parameter values remain unchanged (e.g., the GRPs are at the baseline level)) and the box 224 can display how the selection affects the aggregate value and the change in conversions. For example, by selecting the timing of the airing of media promos to be midday, the value optimization engine 144 determines that the number of conversions increased by 200 conversions and the aggregate value increased by $0.25 million.

The user can also indicate whether the media promos should be aired on the same media channel that airs the media program or whether some or all of the media promos should be aired on media channels other than the media channel that airs the media program (referred to herein as the cross-channel percentage) in box 226. For example, the user can indicate that 10% of media promos should be aired on media channels other than the media channel that airs the media program being promoted. In other embodiments, not shown, the user can indicate specific media channels that should air some or all of the media promos. The value optimization engine 144 can rerun the models using the selected cross-channel percentage (and assume that other parameter values remain unchanged (e.g., the GRPs are at the baseline level)) and the box 226 can display how the selection affects the aggregate value and the change in conversions. For example, by selecting a cross-channel percentage of 10%, the value optimization engine 144 determines that the number of conversions decreased by 434 conversions and the aggregate value decreased by $0.05 million.

Other parameters can include demographics, time of day to air the media promo (e.g., daytime, primetime, late night, etc.), popularity of media program, genre of media program, and/or the like.

The value optimization engine 144 can aggregate the aggregate values associated with each parameter depicted in FIG. 2B to generate the aggregate value depicted in the circle 216. Likewise, the value optimization engine 144 can aggregate the conversions associated with each parameter depicted in FIG. 2B to generate the conversions depicted in the circle 216.

The value optimization engine 144 can further identify the parameter values that would achieve the optimal net advertising revenue. For example, the value optimization engine 144 can simultaneously run the models using varying parameter values and identify the set of parameter values that results in the highest net advertising revenue.

As illustrated in FIG. 2C, the user interface 200 can further display graphs 230, 240, and/or 250. The data depicted in each graph 230, 240, and/or 250 can be generated by the value optimization engine 144 in the process of determining net advertising revenue and/or optimal parameter values for achieving optimal net advertising revenue. The graph 230 may depict media promos seen (or heard) versus the likelihood for viewers to watch (or listen to) a media program for the selected media programs. For example, line 232 may represent the data for media program #1 and line 234 may represent the data for media program #2.

The graph 240 may depict GRPs versus viewership for the selected media programs. For example, line 242 may represent the data for media program #1 and line 244 may represent the data for media program #2.

The graph 250 may be generated by combining the data from graphs 230 and 240. The graph 250 may depict GRPs versus net advertising revenue for the selected media programs. For example, line 252 may represent the data for media program #1 and line 254 may represent the data for media program #2.

Example Process Flow

Figure 3:
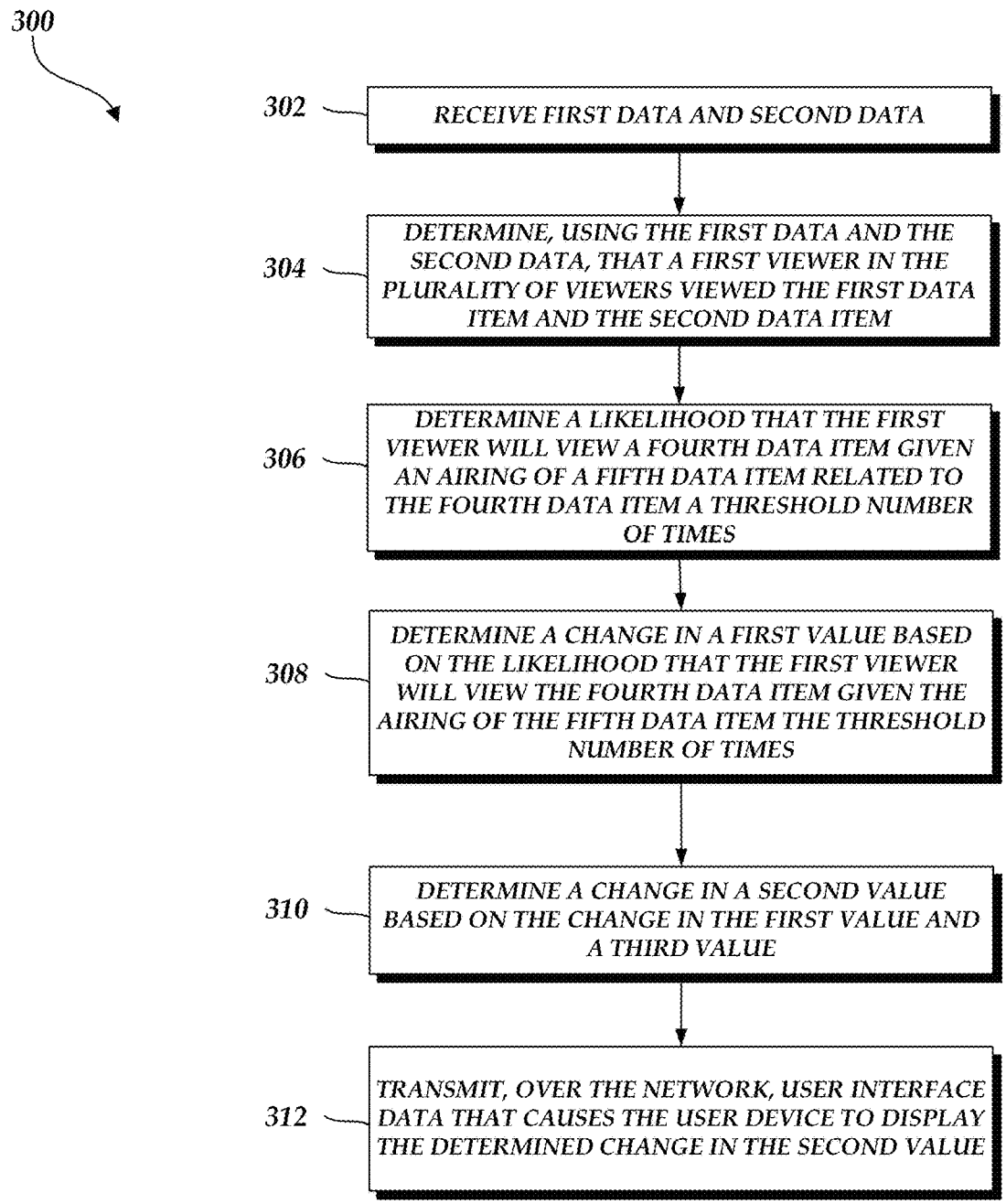
FIG. 3 is a flowchart depicting an illustrative operation of optimizing an assignment of a plurality of data units.

FIG. 3 is a flowchart 300 depicting an illustrative operation of optimizing an assignment of a plurality of data units. The method of FIG. 3 may be performed by various computing devices, such as by the item assignment system 140 described above. Depending on the embodiment, the method of FIG. 3 may include fewer and/or additional blocks and the blocks may be performed in an order different than illustrated.

In block 302, first data and second data are received. The first data may include an identification of a plurality of viewers that viewed (or heard) a first data item (e.g., a first media program) and a second plurality of viewers that viewed (or heard) a second data item (e.g., a second media program). The second data may include an identification of a third data item associated with the second data item that aired during the first data item (e.g., a media promo of the second media program) and a number of times that the third data item aired during the first data item.

In block 304, using the first data and the second data, that a first viewer in the plurality of viewers viewed (or heard) the first data item and the second data item is determined. For example, the first viewer may have both watched (or listened to) the first media program and the second media program, meaning the first viewer also saw (or heard) the media promo of the second media program that was aired during the first media program.

In block 306, a likelihood that the first viewer will view (or listen to) a fourth data item given an airing of a fifth data item related to the fourth data item a threshold number of times is determined. For example, the fourth data item may be a third media program and the fifth data item may be a media promo of the third media program. The determination of the likelihood can be based on an age of the first viewer, a gender of the first viewer, viewing (or listening) habits of the first viewer, and/or the number of times that the third data item aired during the first data item.

In block 308, a change in a first value based on the likelihood that the first viewer will view (or hear) the fourth data item given the airing of the fifth data item the threshold number of times is determined. For example, the first value may be the advertising revenue increase achieved in the future as a result of increased viewers of the promoted media program.

In block 310, a change in a second value based on the change in the first value and a third value is determined. For example, the second value may be the net advertising revenue and the third value may be the media promo opportunity cost.

In block 312, user interface data is transmitted over the network. The user interface data that causes the user device to display the determined change in the second value.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
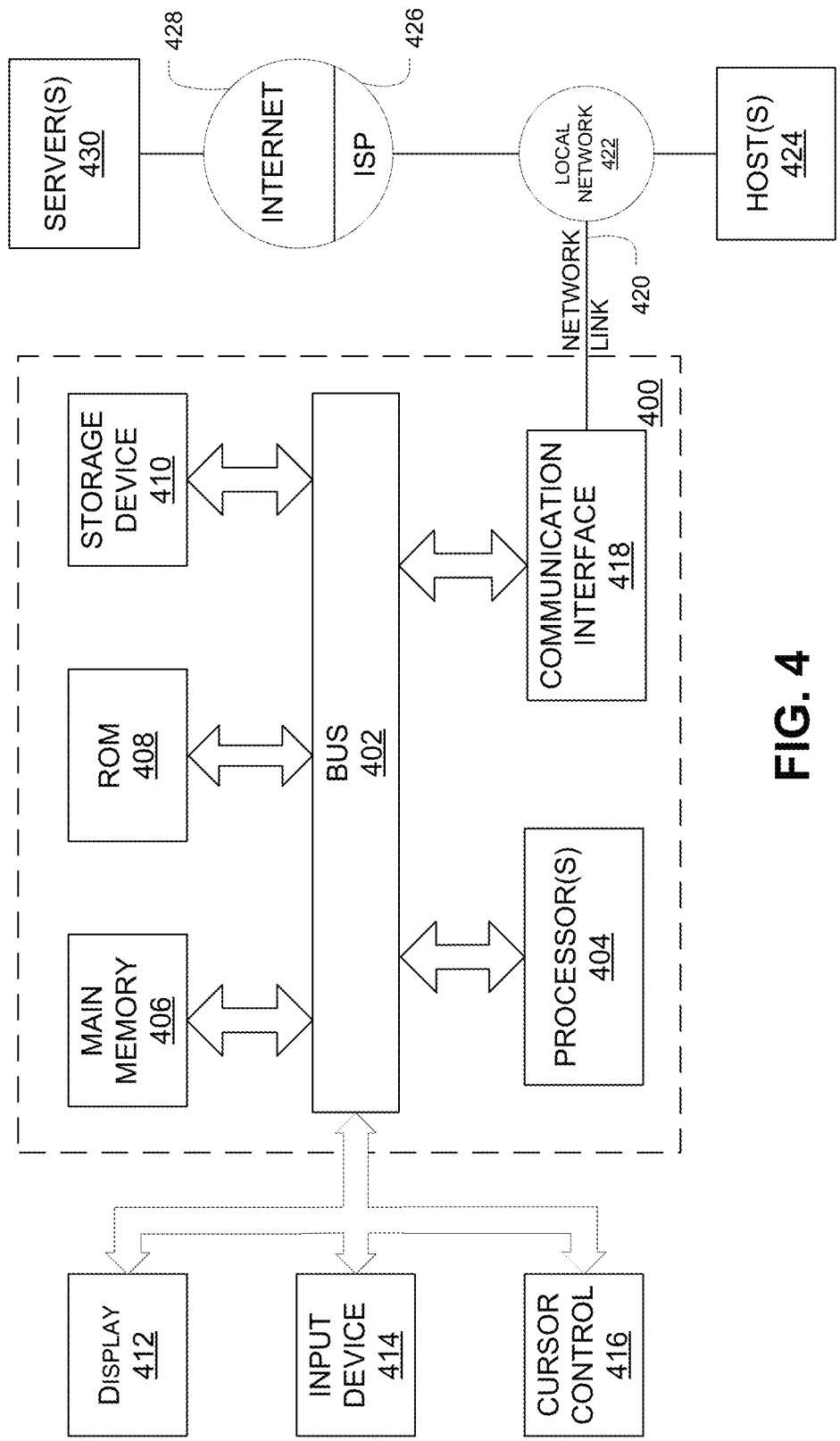
FIG. 4 illustrates a computer system with which certain methods discussed herein may be implemented, according to one embodiment.

For example, FIG. 4 is a block diagram that illustrates a computer system 400 upon which an embodiment may be implemented. For example, any of the computing devices discussed herein may include some or all of the components and/or functionality of the computer system 400.

Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions. Main memory 406 may also store cached data, such as zoom levels and maximum and minimum sensor values at each zoom level.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions. For example, the storage device 410 may store measurement data obtained from a plurality of sensors.

Computer system 400 may be coupled via bus 402 to a display 412, such as a cathode ray tube (CRT) or LCD display (or touch screen), for displaying information to a computer user. For example, the display 412 can be used to display any of the user interfaces described herein with respect to FIGS. 2 through 5C. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieve and execute the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating or otherwise vexing to user.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method for optimizing an assignment of a plurality of data units comprising:
   receiving, from a user device over a network, first data and second data, wherein the first data comprises an identification of a plurality of viewers that viewed a first media program and a second plurality of viewers that viewed a second media program, and wherein the second data comprises an identification of a first media promo associated with the second media program that aired during the first media program and a number of times that the first media promo aired during the first media program;
   determining, using the first data, that a first viewer in the plurality of viewers viewed the first media program and the second media program;
   determining a likelihood that the first viewer will view a third media program given an airing of a second media promo related to the third media program a threshold number of times, wherein the determination of the likelihood is based on an age of the first viewer, a gender of the first viewer, viewing habits of the first viewer, and the number of times that the first media promo aired during the first media program;
   determining a change in advertising revenue based on the likelihood that the first viewer will view the third media program given the airing of the second media promo the threshold number of times;
   determining a change in net advertising revenue based on the change in the advertising revenue and a media promo opportunity cost;
   generating user interface code that causes the user device to display a user interface comprising a first shape that has a first size and depicts the determined change in the net advertising revenue, a second shape that has a second size that is larger than the first size, and a toggle bar that, when adjusted, causes a change to a parameter associated with an airing of the second media promo, causes a change to the first size of the first shape, and causes an update to the change in the net advertising revenue to be determined based on the change to the parameter;
   transmitting, over the network, the user interface code to the user device;
   receiving, via the user interface, an indication that the toggle bar is adjusted;
   in response to receiving the indication that the toggle bar is adjusted, generating updated user interface code that causes the user device to display an updated user interface depicting the first shape having a third size that is larger than the second size and the update to the change in the net advertising revenue that results from the adjustment to the toggle bar; and
   transmitting the updated user interface code to the user device.

2. The computer-implemented method of claim 1, wherein the first media promo promotes the second media program.

3. The computer-implemented method of claim 1, wherein determining, using the first data, that a first viewer in the plurality of viewers viewed the first media program and the second media program further comprises determining that the first viewer in the plurality of viewers viewed the first media program and the second media program because the first data and the second data indicates that the first viewer viewed the first media program and the first media promo.

4. The computer-implemented method of claim 1, wherein determining a change in advertising revenue further comprises:
   receiving an indication of a selection of a first parameter;
   determining a second likelihood that the first viewer will view the third media program given the airing of the second media promo the threshold number of times according to the first parameter; and
   determining the change in the advertising revenue based on the second likelihood.

5. The computer-implemented method of claim 4, wherein the first parameter is one of a change in a baseline gross rating point, a selection of a time for airing the second media promo, a media channel on which the second media promo is aired, viewer demographics, a selection of a time of day that the second media promo is aired, or a genre of the third media program.

6. The computer-implemented method of claim 1, wherein the user interface code further comprises an indication in a change in conversions determined as a result in a change in a number of times that the second media promo is aired.

7. The computer-implemented method of claim 1, wherein the user interface code further comprises a graph depicting a change in a likelihood for the plurality of viewers to watch the third media program as a function of a number of times that the second media promo is aired.

8. The computer-implemented method of claim 1, wherein the user interface code further comprises a graph depicting a change in viewership of the third media program as a function of a number of impressions associated with the third media program.

9. The computer-implemented method of claim 1, wherein the advertising revenue is generated as a result of airing the third media program.

10. A system for optimizing an assignment of a plurality of data units, the system comprising:
   a database configured to store first data and second data, wherein the first data comprises an identification of a plurality of viewers that viewed a first media program and a second plurality of viewers that viewed a second media program, and wherein the second data comprises an identification of a first media promo associated with the second media program that aired during the first media program and a number of times that the first media promo aired during the first media program;
   a data store configured to store computer-executable instructions; and
   a processor in communication with the data store, wherein the computer-executable instructions, when executed, cause the processor to:
      retrieve, over a network, the first data and the second data;
      determine, using the first data, that a first viewer in the plurality of viewers viewed the first media program and the second media program;
      determine a likelihood that the first viewer will view a third media program given an airing of a second media promo related to the third media program a threshold number of times, wherein the determination of the likelihood is based on at least one of an age of the first viewer, a gender of the first viewer, viewing habits of the first viewer, or the number of times that the first media promo aired during the first media program;
      determine a change in advertising revenue based on the likelihood that the first viewer will view the third media program given the airing of the second media promo the threshold number of times;
      determine a change in net advertising revenue based on the change in the advertising revenue and a media promo opportunity cost;
      generate user interface code that causes the user device to display a user interface comprising a first shape that has a first size and depicts the determined change in the net advertising revenue, a second shape that has a second size that is larger than the first size, and a toggle bar that, when adjusted, causes a change to a parameter associated with an airing of the second media promo, causes a change to the first size of the first shape, and causes an update to the change in the net advertising revenue to be determined based on the change to the parameter;
      transmit the user interface code to the user device;
      retrieve an indication via the user interface that the toggle bar is adjusted;
      in response to reception of the indication that the toggle bar is adjusted, generate updated user interface code that causes the user device to display an updated user interface depicting the first shape having a third size that is larger than the second size and the update to the change in the net advertising revenue that results from the adjustment to the toggle bar; and
      transmit the updated user interface code to the user device.

11. The system of claim 10, wherein the first media promo promotes the second media program.

12. The system of claim 10, wherein the computer-executable instructions, when executed, further cause the processor to determine that the first viewer in the plurality of viewers viewed the first media program and the second media program because the first data and the second data indicates that the first viewer viewed the first media program and the first media promo.

13. The system of claim 10, wherein the computer-executable instructions, when executed, further cause the processor to:
   receive an indication of a selection of a first parameter;
   determine a second likelihood that the first viewer will view the third media program given the airing of the second media promo the threshold number of times according to the first parameter; and
   determine the change in the advertising revenue based on the second likelihood.

14. The system of claim 13, wherein the first parameter is one of a change in a baseline gross rating point, a selection of a time for airing the second media promo, a media channel on which the second media promo is aired, viewer demographics, a selection of a time of day that the second media promo is aired, or a genre of the third media program.

15. The system of claim 10, wherein the user interface code further comprises an indication in a change in conversions determined as a result in a change in a number of times that the second media promo is aired.

16. The system of claim 10, wherein the user interface code further comprises a graph depicting a change in a likelihood for the plurality of viewers to watch the third media program as a function of a number of times that the second media promo is aired.

17. The system of claim 10, wherein the user interface code further comprises a graph depicting a change in viewership of the third media program as a function of a number of impressions associated with the third media program.

* * * * *